US009651985B2

(12) United States Patent
Shih et al.

(10) Patent No.: US 9,651,985 B2
(45) Date of Patent: May 16, 2017

(54) ACCESSORY, ELECTRONIC ASSEMBLY AND CONTROLLING METHOD

(71) Applicant: HTC Corporation, Taoyuan County (TW)

(72) Inventors: Wen-Yu Shih, Taoyuan County (TW); Michael Ross Massucco, San Francisco, CA (US); Matthew John Barthelemy, San Francisco, CA (US); Bernhard Wildner, San Francisco, CA (US)

(73) Assignee: HTC CORPORATION, Taoyuan (TW)

(*) Notice: Subject to any disclaimer, the term of this patent is extended or adjusted under 35 U.S.C. 154(b) by 133 days.

(21) Appl. No.: 14/094,799

(22) Filed: Dec. 3, 2013

(65) Prior Publication Data
US 2015/0153768 A1 Jun. 4, 2015

(51) Int. Cl.
G06F 1/16 (2006.01)
G06F 3/041 (2006.01)
(Continued)

(52) U.S. Cl.
CPC ......... G06F 1/1613 (2013.01); G02B 27/022 (2013.01); G06F 1/1626 (2013.01);
(Continued)

(58) Field of Classification Search
CPC ...... G06F 1/1613; G06F 3/041; G06F 3/0416; G06F 3/14; G06F 1/1677; G06F 1/1628;
(Continued)

(56) References Cited

U.S. PATENT DOCUMENTS 6,718,611 B1 * 4/2004 Lai .................................. 29/412
D656,929 S 4/2012 Hsiung
(Continued)

FOREIGN PATENT DOCUMENTS

CN 101080067 A 11/2007
CN 301434890 1/2011
(Continued)

OTHER PUBLICATIONS

"First Office Action of U.S. Counterpart Application, U.S. Appl. No. 14/224,056", issued on Nov. 14, 2014, p. 1-p. 34.
(Continued)

Primary Examiner — Kumar Patel
Assistant Examiner — Amy C Onyekaba
(74) Attorney, Agent, or Firm — McClure, Qualey & Rodack, LLP

(57) ABSTRACT

An accessory suitable for an electronic device is provided. The electronic device has a display area. The accessory includes a coupling portion and a cover portion. The coupling portion is suitable to be coupled to the electronic device. The cover portion is connected to the coupling portion and is suitable for covering the display area of the electronic device. The cover portion has a plurality of light-transmitting areas, and the light-transmitting areas are arranged on the display area in an array. An image generated by the display area is projected out of the cover portion through the light-transmitting areas. Moreover, an electronic assembly containing the electronic device and the accessory is also provided. Furthermore, a controlling method is also provided for controlling the electronic assembly.

25 Claims, 8 Drawing Sheets

(51) Int. Cl.
  *G02B 27/02* (2006.01)
  *H04M 1/725* (2006.01)
  *A45C 11/00* (2006.01)
  *G09G 5/00* (2006.01)

(52) U.S. Cl.
  CPC .......... *G06F 1/1628* (2013.01); *G06F 1/1677* (2013.01); *G06F 3/041* (2013.01); *G06F 3/0416* (2013.01); *H04M 1/72575* (2013.01); *A45C 2011/002* (2013.01); *A45C 2011/003* (2013.01); *G06F 2200/1633* (2013.01); *G06F 2200/1634* (2013.01); *G09G 5/00* (2013.01); *G09G 2330/022* (2013.01); *H04M 1/72527* (2013.01); *H04M 2250/12* (2013.01)

(58) Field of Classification Search
  CPC ............... G06F 1/1626; G02B 27/022; H04M 1/72575; H04M 1/0241; H04M 1/0266; H04M 2250/12; A45C 2011/003; A45C 2011/002
  USPC ........................................................ 455/575.8
  See application file for complete search history.

(56) References Cited

U.S. PATENT DOCUMENTS

| | | | |
|---|---|---|---|
| D657,354 S | 4/2012 | Kim | |
| 8,350,874 B2 | 1/2013 | Lim et al. | |
| 8,892,162 B2* | 11/2014 | Garrone | H04M 1/72563 345/156 |
| 2004/0058703 A1 | 3/2004 | Eromaki et al. | |
| 2005/0286212 A1 | 12/2005 | Brignone et al. | |
| 2006/0022954 A1 | 2/2006 | Berry | |
| 2006/0289284 A1* | 12/2006 | Han | 200/310 |
| 2007/0268202 A1* | 11/2007 | Lim et al. | 345/1.1 |
| 2008/0069384 A1 | 3/2008 | Kim et al. | |
| 2008/0165142 A1* | 7/2008 | Kocienda | G06F 3/04886 345/173 |
| 2008/0204428 A1* | 8/2008 | Pierce | G06F 3/0202 345/174 |
| 2008/0280083 A1* | 11/2008 | Qiu et al. | 428/35.8 |
| 2009/0058830 A1* | 3/2009 | Herz | G06F 3/044 345/173 |
| 2010/0048268 A1* | 2/2010 | O'Neill | H04B 1/3888 455/575.8 |
| 2010/0078343 A1* | 4/2010 | Hoellwarth et al. | 206/320 |
| 2010/0273530 A1* | 10/2010 | Jarvis et al. | 455/566 |
| 2011/0045812 A1 | 2/2011 | Kim et al. | |
| 2011/0063205 A1* | 3/2011 | Kufner | 345/156 |
| 2011/0195224 A1 | 8/2011 | Zhang et al. | |
| 2012/0071217 A1 | 3/2012 | Park | |
| 2012/0085679 A1* | 4/2012 | Kim | A45C 3/001 206/736 |
| 2012/0194448 A1 | 8/2012 | Rothkopf | |
| 2012/0212430 A1* | 8/2012 | Jung | G06F 1/1626 345/173 |
| 2012/0212447 A1* | 8/2012 | Huang | G06F 3/044 345/174 |
| 2012/0231852 A1* | 9/2012 | Forstall | G06F 9/4451 455/566 |
| 2012/0263936 A1 | 10/2012 | Krzyak et al. | |
| 2012/0268891 A1 | 10/2012 | Cencioni | |
| 2013/0027867 A1 | 1/2013 | Lauder et al. | |
| 2013/0076614 A1* | 3/2013 | Ive et al. | 345/156 |
| 2013/0109435 A1* | 5/2013 | McCaughey | H01Q 1/243 455/556.1 |
| 2013/0147753 A1* | 6/2013 | Griffin | 345/174 |
| 2013/0176241 A1 | 7/2013 | Byun et al. | |
| 2013/0249861 A1* | 9/2013 | Chang | G06F 3/0412 345/174 |
| 2013/0300679 A1 | 11/2013 | Oh et al. | |
| 2014/0128131 A1* | 5/2014 | Sin | H04M 1/185 455/575.8 |
| 2014/0159867 A1* | 6/2014 | Sartee et al. | 340/6.1 |
| 2014/0174846 A1 | 6/2014 | Molinaro | |
| 2014/0185206 A1 | 7/2014 | Kim et al. | |
| 2014/0268517 A1 | 9/2014 | Moon et al. | |
| 2014/0282059 A1* | 9/2014 | Oh | G06F 1/1641 715/744 |
| 2015/0022474 A1* | 1/2015 | Sossenheimer | G01S 17/026 345/173 |

FOREIGN PATENT DOCUMENTS

| | | |
|---|---|---|
| CN | 301636858 | 8/2011 |
| CN | 201958003 | 9/2011 |
| CN | 301872369 | 3/2012 |
| CN | 302220043 | 12/2012 |
| CN | 302225913 | 12/2012 |
| CN | 302491894 S | 7/2013 |
| CN | 302530249 | 8/2013 |
| CN | 203178852 U | 9/2013 |
| CN | 302655611 | 11/2013 |
| CN | 302707016 | 1/2014 |
| EP | 1860488 | 11/2007 |
| EP | 002046607-0005 | 6/2012 |
| EP | 2662746 | 11/2013 |
| JP | H04135800 | 5/1992 |
| JP | 2005017356 | 1/2005 |
| JP | 2005202301 | 7/2005 |
| JP | 1406405 | 1/2011 |
| KR | 30-0510296 | 10/2008 |
| KR | 30-0647648 | 6/2012 |
| KR | 30-0707696 | 9/2013 |
| KR | 30-0718965 | 12/2013 |
| TW | D138201 | 12/2010 |
| TW | D145123 | 1/2012 |
| TW | M421678 | 1/2012 |
| TW | D135002 | 4/2013 |
| TW | D152893 | 4/2013 |
| TW | 201323915 | 6/2013 |
| TW | M461292 | 9/2013 |
| TW | D158992 | 2/2014 |
| TW | D162739 | 9/2014 |
| WO | 2009145154 | 12/2009 |

OTHER PUBLICATIONS

"Final Office Action of U.S. Counterpart Application, U.S. Appl. No. 14/224,056", issued on Mar. 18, 2015, p. 1-p. 31.
"Office Action of U.S. Appl. No. 14/224,056", issued on Jul. 22, 2015, p. 1-p. 21.
"Office Action of Taiwan Counterpart Application", issued on Aug. 25, 2014, p. 1-p. 5.
"Office Action of Taiwan Counterpart Application", issued on Sep. 11, 2014, p. 1-p. 4.
Incase CL56250 Perforated Snap Case for iPod Touch 2G, http://www.amazon.com/dp/B002SK1EAA?_encoding=UTF8&camp=15041&creative=373501&linkCode=as3&tag=crazool-20, Incase Designs (Ref. 7).
iPad Air case | Mesh Shell Case for iPad Air Mat Black | IRUAL | IRMSD500-MBK, http://www.amazon.com/iPad-SHELL-BLACK-IRUAL-IRMSD500-MBK/dp/B00GJIV3R6/ref=sr_1_3?s=electronics&ie=UTF8&qid=1423107499&sr=1-3&keywords=mesh+shell+case+for+ipad+air, IRUAL (Ref. 8).
Unboxing: GGMM Leather Flip Cover Case for iPhone5, Retrieved Dec. 24, 2012, from http://www.web.archive.org/web/20121224001918/http://www.macuknow.com/node/20575 (Ref. 13).
Mesh Shell Case for iPhone 5, Retrieved Mar. 27, 2015, from http://detail.1688.com/offer/1192700281.html?spm=0.0.0.0.tsfgGZ (Ref. 15).
LuLu, "Ordinary Price, Extraordinary Performance—Nokia 5800 XpressMusic", Nov. 30, 2008, available at: http://www.mobile01.com/topicdetail.php?f=122&t=854962 (Ref. 17).
"Notice of Allowance of TW Related Application, application No. 103301646" issued on Jul. 18, 2014, p. 1-p. 7.

(56) References Cited

OTHER PUBLICATIONS

"Notice of Allowance of JP Related Application, application No. 2014-016447" issued on Jan. 13, 2015, p. 1-p. 2.
"Grounds for Patent Invalidation of TW Related Application, application No. 103301646" issued on May 7, 2015, p. 1-p. 16.
"Evaluation Report of Design Patent of CN Related Application, application No. 201430061577.4," issued on Oct. 17, 2014, with English translation thereof, p. 1-p. 28.
"Search Report of Europe Counterpart Application", issued on Jan. 7, 2015, p. 1-p. 4.
"Office Action of Europe Counterpart Application", issued on Jan. 23, 2015, p. 1-p. 9.
China Office Action issued Dec. 28, 2016.

* cited by examiner

ACCESSORY, ELECTRONIC ASSEMBLY AND CONTROLLING METHOD

BACKGROUND OF THE INVENTION

Field of the Invention

The application is related to an accessory, and more particularly, to an accessory applied in an electronic device and a relevant controlling method.

Description of Related Art

Due to their diverse functions and thin design, tablet devices such as the smart phone and the tablet computer are very popular among consumers. As a result, relevant accessories are also vigorously developed. In particular, accessories such as the protective sleeve and the protective cover are most popular among consumers. One protective sleeve utilizes a wallet-style or a book-style design, and this type of protective sleeve may cover the display area (such as the touch display screen) of the tablet device through the cover body of the protective sleeve to avoid damage to the display area. Similarly, the protective cover also has a cover body to achieve similar protection. However, when receiving a notification, a user needs to open the cover body to be able to see the content of the notification in the display area. For instance, when receiving a call, the user needs to open the cover body to be able to see the caller in the display area to decide whether to answer the call. These issues all cause inconvenience in use.

SUMMARY OF THE INVENTION

The application is directed to an accessory for protecting an electronic device and projecting an image of a display area of the electronic device.

The application is directed to an electronic assembly. An accessory of the electronic assembly may project an image of a display area of the electronic device of the electronic assembly.

The application is directed to a controlling method for controlling an electronic device having a display area covered by a cover portion of an accessory.

The application provides an accessory suitable for an electronic device. The electronic device has a display area. The accessory includes a coupling portion and a cover portion. The coupling portion is suitable to be coupled to the electronic device. The cover portion is connected to the coupling portion and is suitable for covering the display area of the electronic device. The cover portion has a plurality of light-transmitting areas, and the light-transmitting areas are arranged on the display area in an array. An image generated by the display area is projected out of the cover portion through the light-transmitting areas.

The application provides an electronic assembly including an electronic device and an accessory. The electronic device has a display, a touch sensor, and a processing unit forming a display area. The touch sensor is overlapped with the display. The processing unit is coupled to the touch sensor and the display. The accessory includes a coupling portion and a cover portion. The coupling portion is suitable to be coupled to the electronic device. The cover portion is connected to the coupling portion and is suitable for covering the display area of the electronic device. The cover portion has a plurality of light-transmitting areas, and the light-transmitting areas are arranged on the display area in an array. An image generated by the display area is projected out of the cover portion through the light-transmitting areas.

The application provides a controlling method. The controlling method is suitable for controlling an electronic assembly. The electronic assembly includes an electronic device and an accessory. The electronic device has a display area. The accessory has a cover portion for covering the display area of the electronic device. The cover portion has a plurality of light-transmitting areas. The light-transmitting areas are arranged on the display area in an array. The controlling method includes the following steps. An event is received through the electronic device. Next, an image is generated through the display area according to the event, and the image generated by the display area is projected out of the cover portion through the light-transmitting areas.

Based on the above, in the application, a plurality of light-transmitting areas arranged in an array are formed on a cover portion of an accessory. When the cover portion covers the display area of the electronic device, the image of the display area may still be projected out of the cover portion through the light-transmitting areas of the cover portion. Therefore, a user may still view the image displayed in the display area through the light-transmitting areas of the cover portion without opening or moving the cover portion. Moreover, a high-resolution image may be displayed in the display area not covered by the cover portion, and the display area covered by the cover portion may display a low-resolution image according to the density of the light-transmitting areas. Moreover, in the application, the electronic device is controlled under such hardware settings by corresponding to an event received by the electronic device to achieve diverse applications.

To make the above features and advantages of the application more comprehensible, several embodiments accompanied with drawings are described in detail as follows.

DETAILED DESCRIPTION OF DISCLOSED EMBODIMENTS

Figure 1:
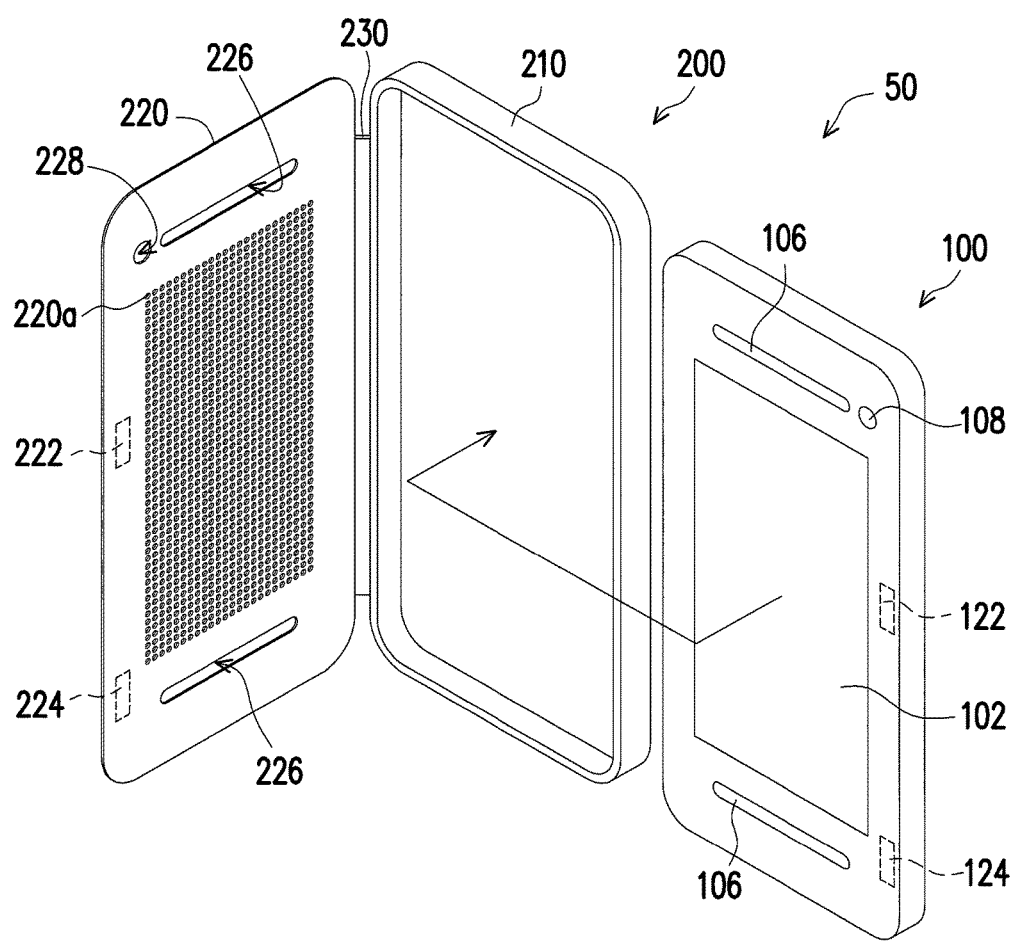
FIG. 1 is a schematic view of an electronic assembly of an embodiment of the application before assembly.
Figure 2:
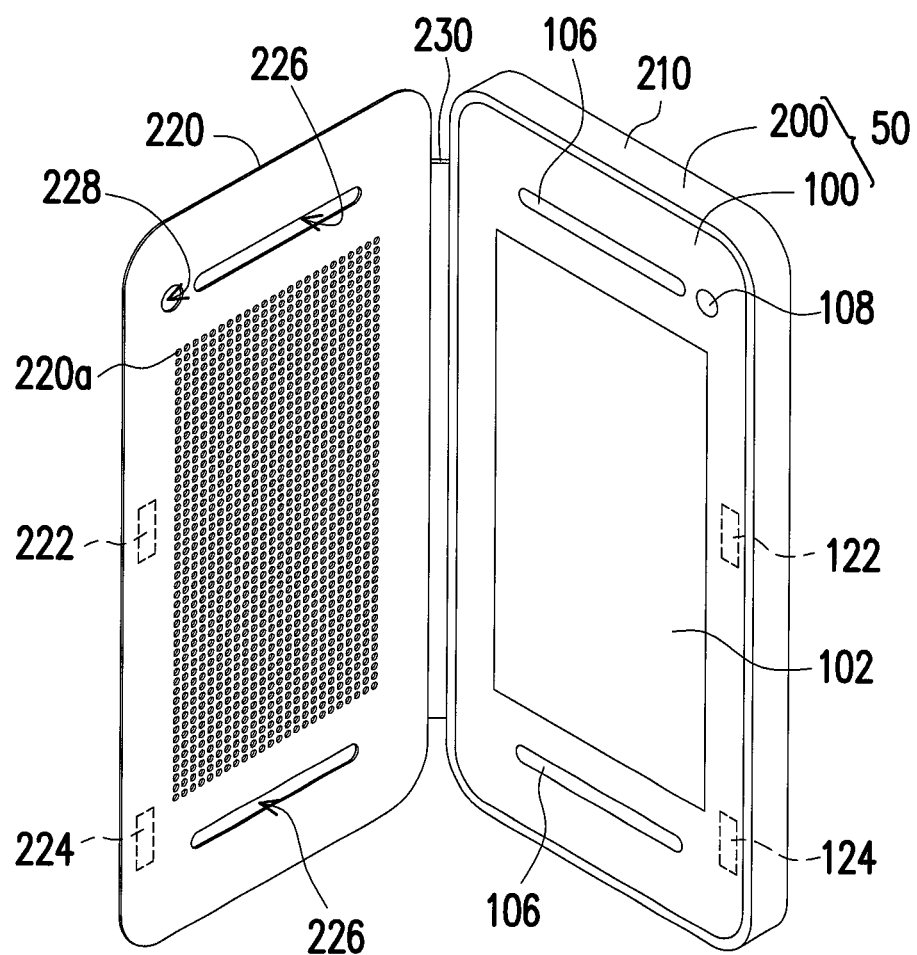
FIG. 2 is a schematic view of the electronic assembly of FIG. 1 after assembly.
Figure 3:
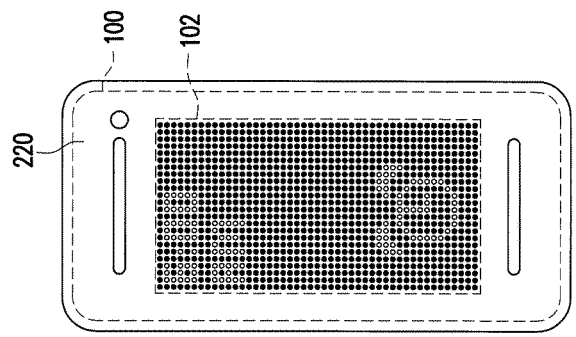
FIG. 3 is a front view of the electronic device of FIG. 1.

Referring to FIG. 1, FIG. 2, and FIG. 3, an electronic assembly 50 of the present embodiment includes an electronic device 100 and an accessory 200 applied in the electron device 100. In the present embodiment, the electronic device 100 is a smart phone. However, in other embodiments not shown, the electron device 100 may also be a tablet computer or a similar tablet device. The electronic device 100 has a display area 102. The display area 102 may be a liquid crystal display (LCD) display or an organic light-emitting diode (OLED) display, and the display area 102 may be an entire display or a portion of a display. The accessory 200 includes a coupling portion 210, a cover portion 220, and a flexible portion 230. The coupling portion 210 is suitable to be coupled to the electronic device 100. The cover portion 220 is connected to the coupling portion 210 and is suitable for covering the display area 102 of the electronic device 100. The flexible portion 230 connects the cover portion 220 to the coupling portion 210. In particular, the location of the cover portion 220 relative to the coupling portion 210 may be changed by bending the flexible portion 230 to decide whether to cover the display area 102 of the electronic device 100.

Figure 7:
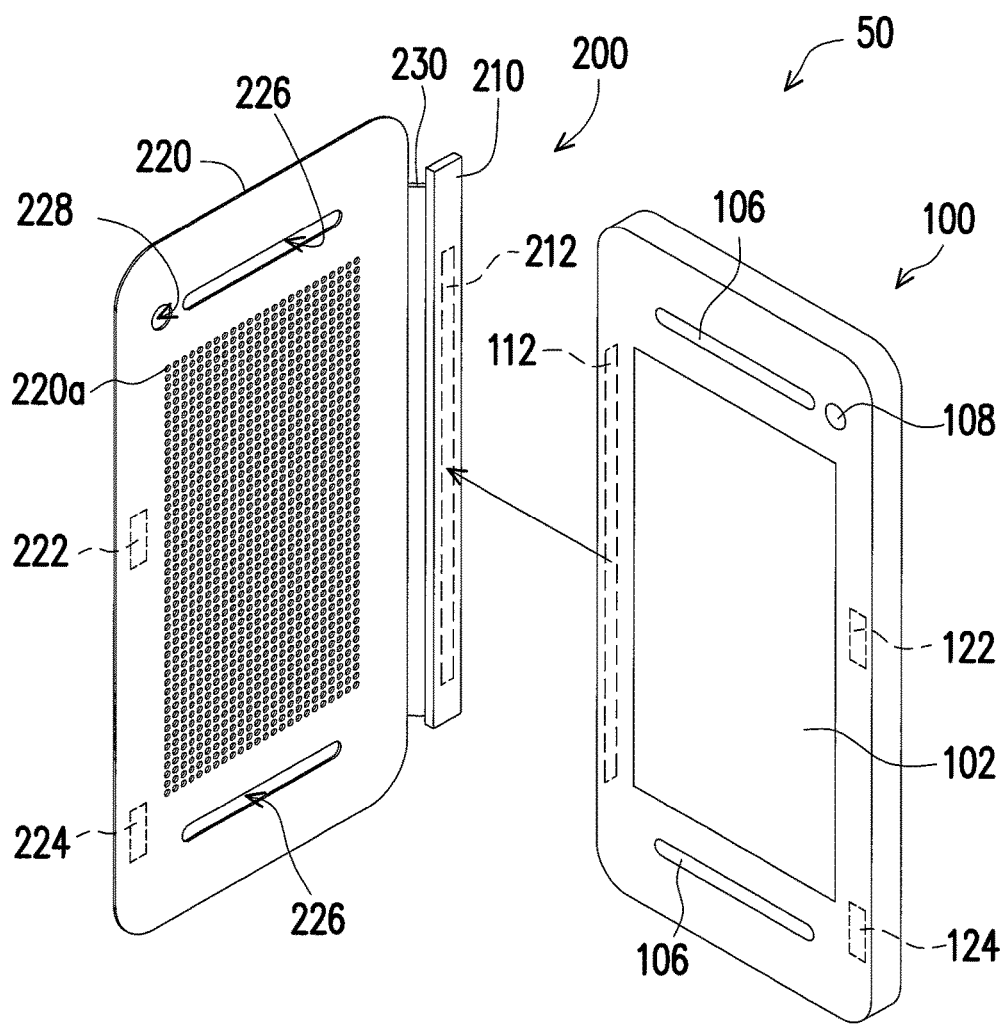
FIG. 7 is a schematic view of an electronic assembly of another embodiment of the application before assembly.

Referring to FIG. 1 and FIG. 2, in order to couple the coupling portion 210 to the electronic device 100 to fix the location of the coupling portion 210 relative to the electronic device 100, the coupling portion 210 is concave and is suitable for structurally covering the outside and the bottom of the electronic device 100, so as to fix the location of the coupling portion 210 relative to the electronic device 100. Moreover, in another embodiment, as shown in FIG. 7, the electronic device 100 has a magnetic coupling member 112, the coupling portion 210 has another magnetic coupling member 212, and the magnetic coupling member 112 and the magnetic coupling member 212 are suitable to be magnetically attracted to each other. The magnetic coupling member 112 and the magnetic coupling member 212 may be a combination of a pair of permanent magnetic members or a combination of a permanent magnetic member and a magnetic sensing portion.

Referring further to FIG. 1 and FIG. 2, to fix the location of the cover portion 220 relative to the display 102, the electronic device 100 has a magnetic attachment member 122, the cover portion 220 has another magnetic attachment member 222, and the magnetic attachment member 122 and the magnetic attachment 222 are suitable to be magnetically attracted to each other. The magnetic attachment member 122 and the magnetic attachment member 222 may be a combination of a pair of permanent magnetic members or a combination of a permanent magnetic member and a magnetic sensing portion.

Referring further to FIG. 1 and FIG. 2, to determine whether the cover portion 200 covers the display area 102, the electronic device 100 has a sensor 124, the cover portion has an element 224, and whether the sensor 124 senses the element 224 determines whether the cover portion 200 covers the display 102. In the present embodiment, the sensor 224 may be a magnetic sensor, and the element 224 may be a magnetic test member. In another embodiment not shown, the magnetic attachment member 222 and the element 224 may be a single magnetic member.

Referring further to FIG. 1 and FIG. 2, the electronic device 100 has a pair of audio output areas 106 (such as two sets of speaker holes) located on two opposite sides of the display area 102, the cover portion 220 covers the pair of audio output areas 104, the cover portion 220 has a pair of audio output holes 226, and the pair of audio output holes 226 respectively expose the pair of audio output areas 106. Moreover, the electronic device has a distance sensing area 108 (for instance, the distance sensor of the electronic device 100 is in the window on the case), the cover portion 220 covers the distance sensing area 108, the cover portion 220 has a distance sensing hole 228, and the distance sensing hole 228 exposes the distance sensing area 108.

Figure 4:
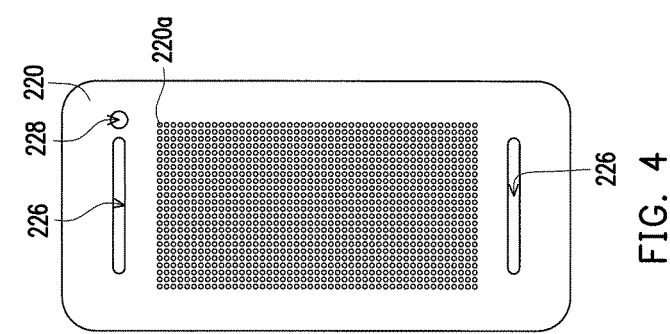
FIG. 4 is a front view of the cover portion of the accessory of FIG. 1.
Figure 5:
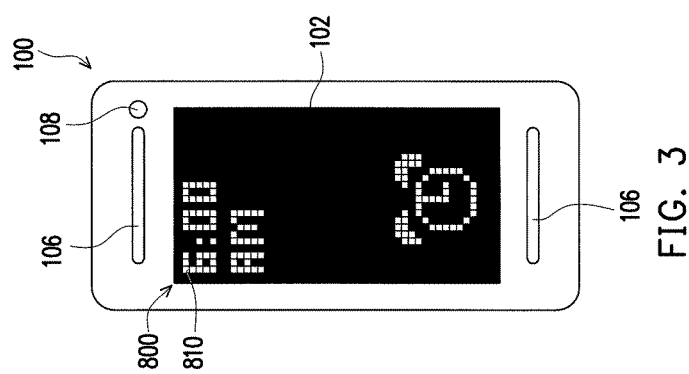
FIG. 5 is a front view of the cover portion of the accessory of FIG. 1 covering the display area of the electronic device.

Referring to FIG. 4 and FIG. 5, the cover portion 220 has a plurality of light-transmitting areas 220a. The light-transmitting areas 220a are arranged on the display area 102 in an array, and an image generated by the display area 102 is suitable to be projected out of the cover portion 220 through the light-transmitting areas 220a to be viewed by the user. Therefore, when a call or a notification is received, the user does not need to open the cover portion 220, and may directly view the image generated by the display area 102 from the light-transmitting areas 220a of the cover portion 220. Moreover, the touch sensitivity of the display area 102 may be manually or automatically increased. Therefore, the user may perform a touch operation or a gesture operation on the display area 102 via the cover portion 220. The array may be, for instance, a linear array, a triangular array, a square array, a rectangular array, a pentagonal array, a hexagonal array, or a polygonal array.

Figure 6:
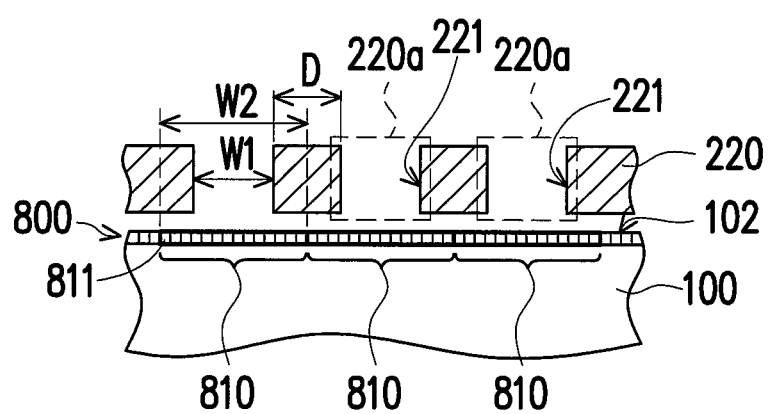
FIG. 6 is a partial cross-sectional view of the cover portion of the accessory of FIG. 1 overlapped with the display area of the electronic device.

Referring to FIG. 3, FIG. 5, and FIG. 6, in the present embodiment, the cover portion 220 has a plurality of through-holes 221 to form the light-transmitting areas 220a. Moreover, an image 800 output by the display area 102 contains a plurality of blocks 810, the blocks 810 respectively correspond to the light-transmitting areas 220a, and each of the blocks 810 further contains a plurality of pixels 811. Specifically, the pixels 811 refer to minimum pixels located in the display area 102 (such as a display screen) capable of generating an image, and the blocks 810 may be a pixel array formed by the plurality of pixels 811. Therefore, as shown in FIG. 3, the blocks 810 may be pieced together to form a character, a symbol, or a pattern, and the pixels 811 of the same block 810 may still display color gradient. In the present embodiment, a maximum width W1 of each of the light-transmitting areas 220a may be less than 3 millimeters to project an image with enough resolution. A high-resolution image may be displayed in the display area 102 not covered by the cover portion 220, and the display area 102 covered by the cover portion 220 may display a low-resolution image according to the density of the light-transmitting areas 220a.

Referring to FIG. 5 and FIG. 6, in the present embodiment, a minimum width W2 of each of the blocks 810 is greater than the maximum width W1 of each of the corresponding light-transmitting areas 220a. Therefore, when the cover portion 220 is not completely aligned with the display area 102 of the electronic device 100, the blocks 810 may still be projected out of the cover portion 220 through the corresponding light-transmitting areas 220a. Moreover, the minimum width W2 of each of the blocks 810 is greater than a shortest distance D between any two adjacent light-transmitting areas 220a to prevent the blocks 810 from being completely shielded by an opaque portion of the cover portion 220.

Figure 8:
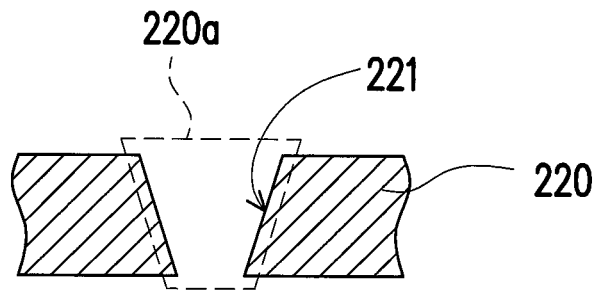
FIG. 8 is a cross-sectional view of a cover portion of an accessory of another embodiment of the application.
Figure 9:
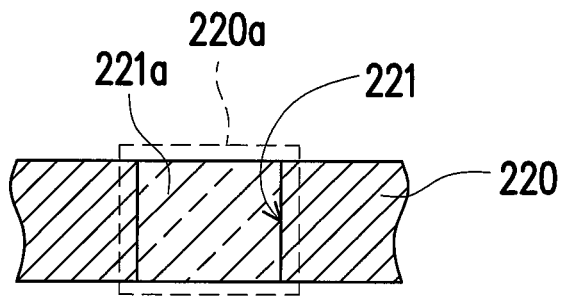
FIG. 9 is a cross-sectional view of a cover portion of an accessory of another embodiment of the application.
Figure 10:
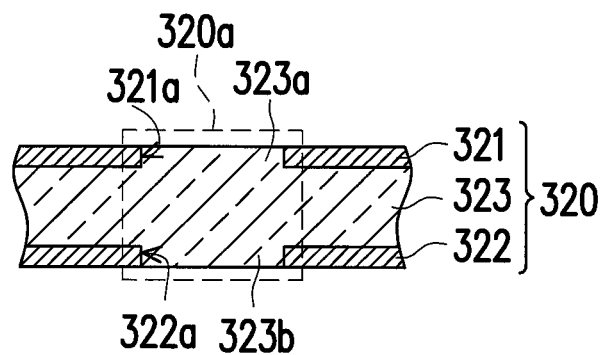
FIG. 10 is a cross-sectional view of a cover portion of an accessory of another embodiment of the application.

Referring to FIG. 8, in comparison to the column through-holes 221 in FIG. 6 that may limit the viewing angle of the user, the through-holes 221 of FIG. 8 have a truncated pyramid shape and may increase the viewing angle of the user. Moreover, referring to FIG. 9, in comparison to the light-transmitting areas 220a in FIG. 6 formed by the through-holes 221, the cover portion 220 of FIG. 9 further includes a plurality of light-transmitting bodies 221a. The light-transmitting bodies 221a are respectively located inside the through-holes 221 to form the light-transmitting areas 220a. Moreover, referring to FIG. 10, different from the cover portion 220 of FIGS. 6, 7, and 8, a cover portion 320 of FIG. 10 has a first opaque layer 321, a second opaque layer 322, and a light-transmitting layer 323 disposed between the first opaque layer 321 and the second opaque layer 322. The first opaque layer 321 has a plurality of first openings 321a, the second opaque layer 322 has a plurality of second openings 322a, and the first openings 321a are respectively aligned with the second openings 322a to form light-transmitting areas 320a. In the present embodiment, the light-transmitting layer 323 has a plurality of first columns 323a and a plurality of second columns 323b. The first columns 323a are respectively extended to the first openings 321a and the second columns 323b are respectively extended to the second openings 322a.

Figure 11:
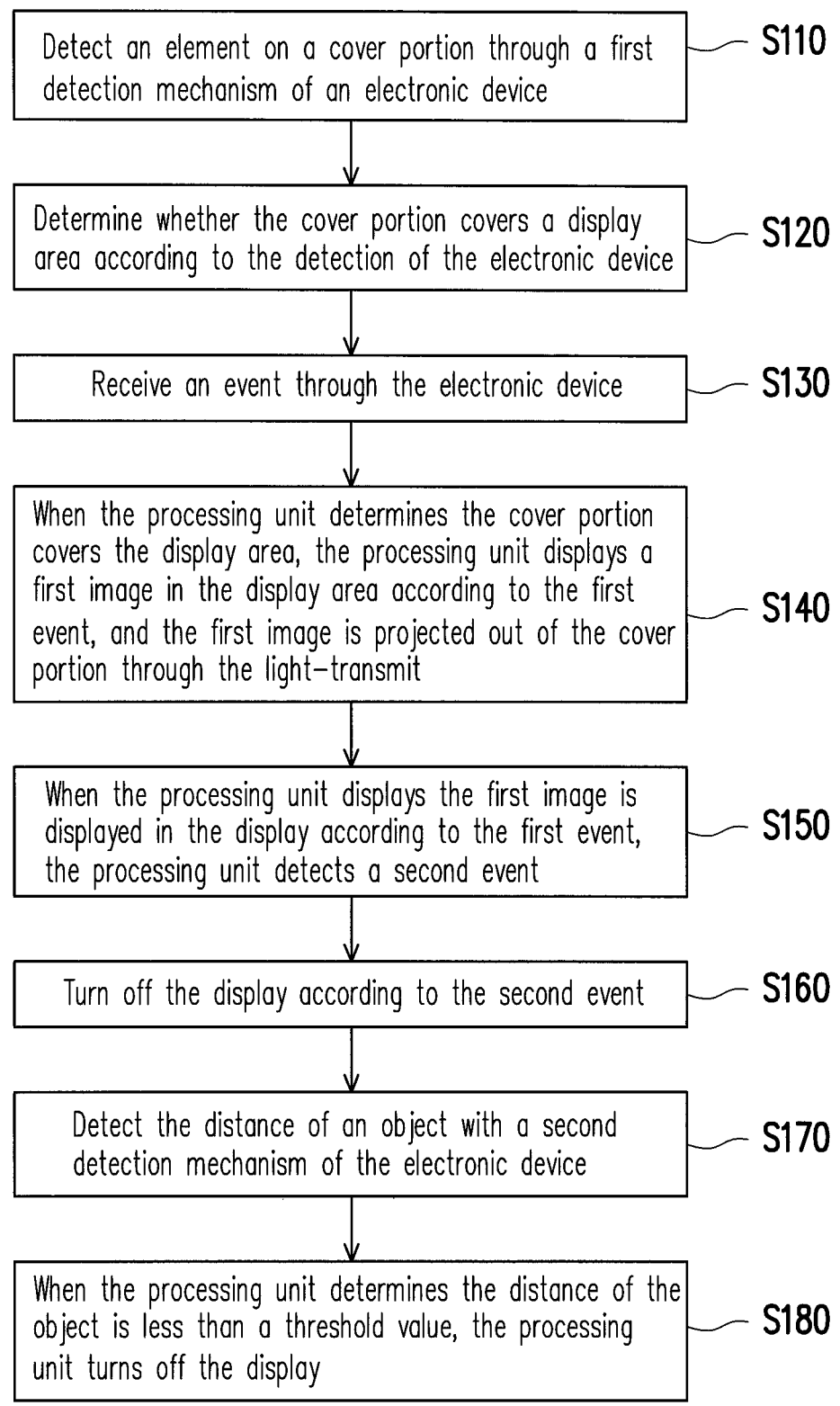
FIG. 11 is a flow chart of a controlling method of another embodiment of the application.
Figure 12:
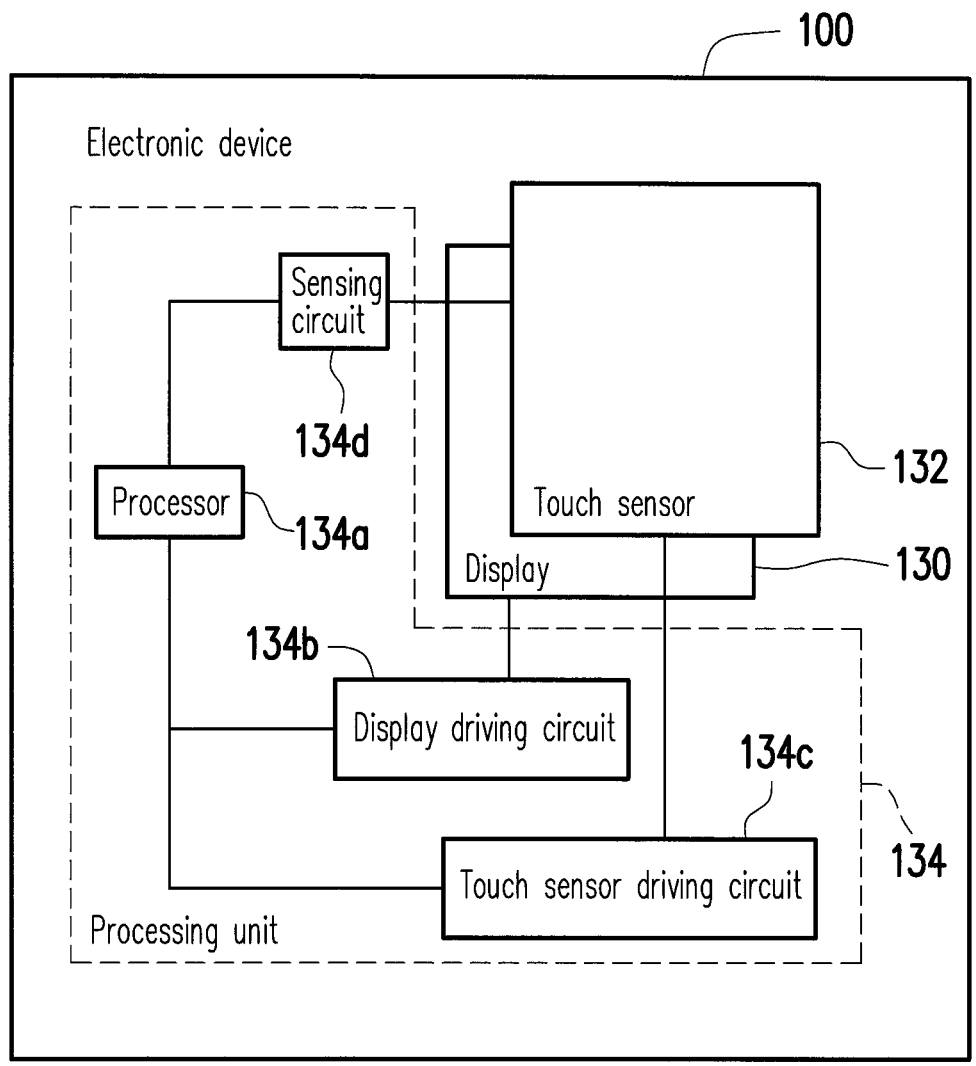
FIG. 12 is a circuit block diagram of the electronic device of FIG. 1.

Referring to FIG. 11 and FIG. 12, the controlling method of the present embodiment is suitable for controlling the electronic assembly 50 of FIG. 1. In particular, FIG. 12 illustrates a circuit block diagram of the electronic device 100 of the electronic assembly 50. In the present embodiment, the electronic device 100 has a display 130, a touch sensor 132, and a processor 134 forming the display area 102. The touch sensor 132 is overlapped with the display 130. The processing unit 134 is coupled to the display 130 and the touch sensor 132.

In the present embodiment, the processing unit 134 includes a processor 134a, a display driving circuit 134b, a touch sensor driving circuit 134c, and a sensing circuit 134d. The display driving circuit 134b is coupled to the display 130 and the processor 134a and drives the display 130 according to a command of the processor 132a. The touch sensor driving circuit 134c is coupled to the touch sensor 132 and the processor 134a and drives the touch sensor 132 according to the command of the processor 132a. The sensing circuit 134d is coupled to the touch sensor 132 and the processor 134a and sends the sensing result of the touch sensor 132 to the processor 132a.

Referring to FIG. 3, FIG. 5, FIG. 11, and FIG. 12, first, as shown in step S110, an element 224 on the cover portion 220 is detected through a first detection mechanism of the electronic device 100. Then, as shown in step S120, whether the cover portion 220 covers the display area 102 is determined through the detection of the electronic device 100.

As shown in step S130, an event is received through the electronic device 100. The event includes the pressing of a key (such as a power key) of the electronic device 100, the touching of the display area 102 of the electronic device 100, the covering of the display area 102 of the electronic device 100 by the cover portion 220 of the accessory 200, or the electronic device 100 receiving a notification. The notification is, for instance, a caller ID, an alarm alert, a new message, or a new mail.

Then, as shown in step S140, when the processing unit 134 determines the cover portion 220 covers the display area 102, the processing unit 134 displays a first image on the display area 102 according to the first event, and the first image is projected out of the cover portion 220 through the light-transmitting areas 220a. Alternatively, when the processing unit 134 determines the cover portion 220 covers the display area 102, the processing unit 134 turns off the display 130. In the present embodiment, in step S140, when the processing unit 134 determines the cover portion 220 covers the display area 102, the touch sensitivity of the touch sensor 132 is increased. When the touch sensitivity of the touch sensor 132 is increased, the user may perform a touch operation or a gesture operation on the touch sensor 132 with the cover portion 220 in between.

Moreover, as shown in step S150, when the processing unit 134 displays the first image on the display 130 according to the first event, the processing unit 134 detects a second event. The second event includes the pressing of a key (such as a power key) or another key of the electronic device 100, or the image displayed in the display area 102 displaying a preset time when the touch sensor 132 is not touched. Then, as shown in step S160, the display 130 is turned off according to the second event. Moreover, as shown in step S170, the distance of an object is detected with a second detection mechanism of the electronic device 100. For instance, the distance sensor 108 may be used to sense whether the head of the user is close. Then, as shown in step S180, when the processing unit 134 determines the distance of the object is less than a threshold value, the processing unit 134 turns off the display 130.

The following refers to the electronic assembly and the controlling method of the embodiments above and presents usage variations in a plurality of different conditions.

In an OFF state (the display is turned off), the power key may be pressed to wake the display and enter a clock interface. When the cover portion of the accessory is removed from the display, the display displays a lock screen. The volume key and the touch sensor do not have an effect.

In a clock face state (the clock interface state), the power key may be pressed to make the system enter a sleep state. The ringer volume may be adjusted by pressing the volume key. The touch sensor may sense lateral sliding to display the next prompt. When the cover portion of the accessory is removed from the display, the display is awakened to the most recent application screen. When still not touched after the preset time (such as 3 seconds), the system enters the sleep state.

When the clock face is in the state of just closed case (the clock interface state when the display is covered by the cover portion), the power key may be pressed to make the system enter the sleep state. The ringer volume may be adjusted by pressing the volume key. The touch sensor may sense traverse sliding to display the next prompt. When the cover portion of the accessory is removed from the display, the display is awakened to the nearest program screen. When not touched after the preset time (such as 3 seconds), the system enters the sleep state.

In an alert state, the power key may be pressed to dismiss an alert and enter the sleep state. The volume key may be pressed to mute the alert. The cover portion of the accessory is brought close to the touch sensor to dismiss the alert. When the cover portion of the accessory is removed from the display, the display displays the lock screen and an alert user interface. When the alert is dismissed longer than the preset time (such as 3 seconds), the system enters the sleep state.

In a notification state (such as the notification of an SMS and or an e-mail), the power key may be pressed to dismiss the alert and enter the sleep state. The ringer volume may be adjusted by pressing the volume key. The cover portion of the accessory is brought close to the touch sensor to dismiss the notification. When the cover portion of the accessory is removed from the display, the display displays a program showing a notification to the most recent notification; alternatively, the display is directly unlocked and enters the program. When the notification is not unlocked after the preset time (such as 8 seconds), the system enters the sleep state.

In an incoming call state, the power key may be pressed to dismiss an incoming call. The volume key may be pressed to mute the ringer. The touch sensor may sense a sliding-up to receive a call; the cover portion of the accessory is brought close to the touch sensor to mute the ringer. When the cover portion of the accessory is removed from the display, the call is answered and an answering screen is displayed. When the caller is disconnected longer than the preset time (such as 3 seconds), the system directly enters the sleep state without dismissing the command.

In an in call state, the power key may be pressed to turn off the screen. The call volume may be adjusted by pressing the volume key. The touch sensor does not have an effect. When the cover portion of the accessory is removed from the display, an in call screen is displayed. If the command is not dismissed after the preset time (such as 3-5 seconds), then the screen is turned off.

In an in call and screen off state, the power key may be pressed to display an in call screen. The call volume may be adjusted by pressing the volume key. The touch sensor does not have an effect. When the cover portion of the accessory is removed from the display, the in call screen is displayed.

Based on the above, in the application, a plurality of light-transmitting areas arranged in an array are formed on a cover portion of an accessory. When the cover portion covers a display area of an electronic device, an image of the display area may still be projected out of the cover portion through the light-transmitting areas of the cover portion. Therefore, a user may still view the image displayed in the display area through the light-transmitting areas of the cover portion without opening or moving the cover portion. Moreover, a high-resolution image may be displayed in the display area not covered by the cover portion, and the display area covered by the cover portion may display a low-resolution image according to the density of the light-transmitting areas. Moreover, in the application, the electronic device is controlled under such hardware settings by corresponding to an event received by the electronic device to achieve diverse applications.

Although the application has been described with reference to the above embodiments, it will be apparent to one of the ordinary skill in the art that modifications and variations to the described embodiments may be made without departing from the spirit and scope of the application. Accordingly, the scope of the application will be defined by the attached claims not by the above detailed descriptions.

What is claimed is:

1. An accessory for an electronic device, wherein the electronic device has an image display area and a distance sensor, the accessory comprising:
    a removable housing having a coupling portion, a cover portion, and a linear segment spanning between the coupling portion and the cover portion;
    the coupling portion being shaped to couple to a back side of the electronic device, the back side being opposite the display area; and
    the cover portion being integrally formed with the coupling portion along the linear segment, the cover portion being movable about the linear segment with respect to the coupling portion between a closed position, at which the cover portion covers the image display area of the electronic device when the coupling portion is coupled to the electronic device, and an open position, at which the image display area is uncovered, wherein the cover portion has a plurality of light-transmitting areas, the plurality of light-transmitting areas are arranged on the display area in an array, an image generated by the display area is projected out of the cover portion through the plurality of light-transmitting areas;
    wherein the cover portion has a distance sensing hole formed therethrough, the distance sensing hole being aligned with the distance sensor when the cover is in the closed position such that the distance sensor remains operative when the cover is in the closed position; and
    wherein the image displayed by the display area is controlled, at least in part, by a position of the cover portion such that when the cover portion is in the closed position, the image output by the display area depicts a plurality of low-resolution blocks, the plurality of low-resolution blocks respectively correspond to the plurality of light-transmitting areas and are visible through the cover portion via the light-transmitting areas, with each of the low-resolution blocks containing a plurality of pixels, and when the cover portion is in the open position, the image generated by the display area is enabled to display at a higher resolution than the low-resolution blocks.

2. The accessory as claimed in claim 1, wherein a maximum width of each of the light-transmitting areas is less than 3 millimeters.

3. The accessory as claimed in claim 1, wherein a minimum width of each of the blocks is greater than the maximum width of each of the corresponding light-transmitting areas.

4. The accessory as claimed in claim 1, wherein the minimum width of each of the blocks is greater than a shortest distance between any two adjacent light-transmitting areas.

5. The accessory as claimed in claim 1, further comprising:
    a flexible portion defining the linear segment coupling the cover portion to the coupling portion.

6. The accessory as claimed in claim 1, wherein the coupling portion is concave and covers the back side of the electronic device to fix a location of the coupling portion relative to the electronic device.

7. The accessory as claimed in claim 1, wherein the electronic device has a magnetic coupling member, the coupling portion has another magnetic coupling member, and the magnetic coupling member and the other magnetic coupling member are magnetically attracted to each other to fix a location of the coupling portion relative to the electronic device.

8. The accessory as claimed in claim 1, wherein the electronic device has a magnetic attachment member, the cover portion has another magnetic attachment member, and the magnetic attachment member and the other magnetic attachment member are magnetically attracted to each other to fix a location of the cover portion relative to the display area.

9. The accessory as claimed in claim 1, wherein the electronic device has a pair of audio output areas, the cover portion covers the pair of audio output areas when in the closed position, the cover portion has a pair of audio output holes, and the pair of audio output holes respectively expose the pair of audio output areas.

10. The accessory as claimed in claim 1, wherein the cover portion has a plurality of through-holes to form the plurality of light-transmitting areas.

11. The accessory as claimed in claim 1, wherein each of the through-holes has a truncated pyramid shape.

12. The accessory as claimed in claim 1, wherein the cover portion has a plurality of through-holes and a plurality of light-transmitting bodies, and the plurality of light-transmitting bodies are respectively located inside the plurality of through-holes to form the plurality of light-transmitting areas.

13. The accessory as claimed in claim 1, wherein the cover portion has a first opaque layer, a second opaque layer, and a light-transmitting layer disposed between the first opaque layer and the second opaque layer, the first opaque layer has a plurality of first openings, the second opaque layer has a plurality of second openings, and the plurality of first openings are respectively aligned with the plurality of second openings to form the plurality of light-transmitting areas.

14. The accessory as claimed in claim 1, wherein the light-transmitting layer has a plurality of first columns and a plurality of second columns, the plurality of first columns are respectively extended to the plurality of first openings, and the plurality of second columns are respectively extended to the plurality of second openings.

15. An electronic assembly, comprising:
an electronic device having a display, a touch sensor, a distance sensor, and a display device having a display area, wherein the touch sensor is overlapped with the display area; and
an accessory comprising:
a removable housing having a coupling portion, a cover portion, and a linear segment spanning between the coupling portion and the cover portion;
the coupling portion being shaped to couple to a back side of the electronic device, the back side being opposite the display area; and
the cover portion being connected to the coupling portion such that the cover portion is movable between positions that alternately cover and expose the display area of the electronic device, wherein the cover portion has a plurality of light-transmitting areas, the plurality of light-transmitting areas are arranged on the display area in an array, and an image generated by the display area is projected out of the cover portion through the plurality of light-transmitting areas;
wherein the cover portion has a distance sensing hole formed therethrough, the distance sensing hole being aligned with the distance sensor when the cover portion covers the display area such that the distance sensor remains operative; and
wherein, in response to the distance sensor sensing an object approaching a threshold distance when the cover portion is closed, the image displayed by the display area is turned off.

16. The electronic assembly as claimed in claim 15, wherein the image displayed by the display area is controlled, at least in part, by a position of the cover portion such that when the cover portion is in the closed position, the image output by the display area depicts a plurality of low-resolution blocks, the plurality of low-resolution blocks respectively correspond to the plurality of light-transmitting areas and are visible through the cover portion via the light-transmitting areas, with each of the low-resolution blocks containing a plurality of pixels, and when the cover portion is in the open position, the image generated by the display area is enabled to display at a higher resolution than the low-resolution blocks.

17. A controlling method for controlling an electronic assembly, wherein the electronic assembly comprises an electronic device and an accessory, the electronic device has a display area, a distance sensor, and a touch sensor, the accessory has a cover portion, the cover portion has a plurality of light-transmitting areas arranged in an array, the cover portion is movable between a closed position, at which the display area is covered by the cover portion, and an open position, and the cover portion has a distance sensing hole formed therethrough, the distance sensing hole being aligned with the distance sensor when the cover is in the closed position, the controlling method comprises:
detecting an element on the cover portion with a first detection mechanism of the electronic device;
detecting a first event;
displaying a first image on the display area based on detection of the first event in response to determining that the cover portion moved from the open position to the closed position to cover the display area, the first image being projected out of the cover portion through the plurality of light-transmitting areas,
sensing with the distance sensor when the cover is in the closed position;
displaying a different image on the display area based on the first event in response to determining that the cover portion moved from the closed position to the open position such that the cover portion is not positioned to cover the display area;
detecting that the cover portion is in the closed position;
displaying an image on the display area in low resolution such that the image is visible through the plurality of light-transmitting areas;
sensing an object approaching a threshold distance from the electronic device when the cover portion is in the closed; and
discontinuing display of the image in response to the sensing of the object when the cover portion is closed.

18. The controlling method as claimed in claim 17, wherein when the first image is displayed on the display, a touch sensitivity of the touch sensor is increased.

19. The controlling method as claimed in claim 17, wherein the event comprises a pressing of a key of the electronic device.

20. The controlling method as claimed in claim 17, wherein the event comprises a touching of the touch sensor on the display.

21. The controlling method as claimed in claim 17, wherein the event comprises the electronic device receiving a notification.

22. The controlling method as claimed in claim 17, further comprising:
detecting a second event when the processing unit displays the first image on the display area according to the first event; and
turning off the display according to the second event.

23. The controlling method as claimed in claim 17, wherein the second event comprises a pressing of the key or another key of the electronic device.

24. The controlling method as claimed in claim 17, wherein the second event comprises the image displaying a preset time when the touch sensor is not touched.

25. The controlling method as claimed in claim 17, further comprising:
detecting a distance of an object with a second detection mechanism of the electronic device;
turning off the display when determining the distance of the object is less than a threshold value.

* * * * *